(12) United States Patent
Fuse et al.

(10) Patent No.: US 7,377,418 B2
(45) Date of Patent: May 27, 2008

(54) METHOD OF BRAZING ALUMINUM PRODUCTS AND FURNACE THEREFOR

(75) Inventors: Masashi Fuse, Kariya (JP); Hidetaka Ikita, Kariya (JP); Susumu Takahashi, deceased, late of Yokohama (JP); by Shin-ichi Takahashi, legal representative, Yokohama (JP)

(73) Assignees: Kanto Yakin Kogyo Kabushiki Kaisha (JP); Denso Corporation (JP)

( * ) Notice: Subject to any disclaimer, the term of this patent is extended or adjusted under 35 U.S.C. 154(b) by 0 days.

(21) Appl. No.: 10/504,842

(22) PCT Filed: Jul. 16, 2003

(86) PCT No.: PCT/JP03/09028

§ 371 (c)(1),
(2), (4) Date: Feb. 1, 2005

(87) PCT Pub. No.: WO2004/009279

PCT Pub. Date: Jan. 29, 2004

(65) Prior Publication Data

US 2005/0145681 A1 Jul. 7, 2005

(30) Foreign Application Priority Data

Jul. 19, 2002 (JP) ............................. 2002-210373

(51) Int. Cl.
*B23K 31/02* (2006.01)

(52) U.S. Cl. .............. 228/219; 228/233.2; 228/262.51

(58) Field of Classification Search ................ 228/119, 228/42, 262.51
See application file for complete search history.

(56) References Cited

U.S. PATENT DOCUMENTS

| | | | | |
|---|---|---|---|---|
| 3,979,168 A | * | 9/1976 | Chauvin | 425/6 |
| 4,622,240 A | * | 11/1986 | Yext et al. | 427/98.4 |
| 5,289,968 A | * | 3/1994 | Maeda et al. | 228/223 |
| 5,330,849 A | * | 7/1994 | Kennedy et al. | 428/552 |
| 5,911,357 A | | 6/1999 | Takahashi | |
| 6,062,464 A | * | 5/2000 | Takahashi | 228/214 |
| 6,769,675 B2 | * | 8/2004 | Vijuk | 270/39.06 |
| 2006/0081682 A1 | * | 4/2006 | Doko et al. | 228/101 |

FOREIGN PATENT DOCUMENTS

| | | |
|---|---|---|
| EP | 0 900 619 A2 | 3/1999 |
| JP | 3-268864 A | 11/1991 |
| JP | 5-215472 A | 8/1993 |
| JP | 6-257949 A | 9/1994 |
| JP | 10-5993 | 1/1998 |
| JP | 11-83332 | 3/1999 |

* cited by examiner

*Primary Examiner*—Kiley Stoner
(74) *Attorney, Agent, or Firm*—Shlesinger, Arkwright & Garvey LLP

(57) ABSTRACT

When aluminium products are preheated in a preheating furnace up to about 500° C. before they are brazed with a flux in a heating furnace, a nitrogen atmosphere in the preheating furnace is made convectional by fans for improving heating efficiencies and also for having the oxygen which is brought into the preheating furnace as a disturbance thereof and scattered about in the nitrogen atmosphere, contacted to furnace inner walls of the preheating furnace which are made from carbonaceous materials, and reacted therewith so as to be changed to CO, resulting in keeping the oxygen concentration of nitrogen atmosphere low, whereby when the aluminium products are brazed by heating them in a continuous atmosphere furnace including said preheating furnace and said heating furnace, heating time thereof is shorten and the brazing is made more economically than before.

2 Claims, 1 Drawing Sheet

US 7,377,418 B2

METHOD OF BRAZING ALUMINUM PRODUCTS AND FURNACE THEREFOR

CROSS-REFERENCE TO RELATED APPLICATIONS

This is a U.S. national phase of PCT/JP2003/009028, filed 16 Jul. 2003, which claims the priority benefit of Japanese application no. 2002-210373, filed 19 Jul. 2002, and each of which is incorporated herein by reference.

FIELD OF TECHNOLOGIES

This invention relates to a method for brazing various products of aluminium including aluminium alloys such as heat exchangers made from aluminium, and a continuous furnace suited for practicing such brazing method.

BACKGROUND TECHNOLOGIES

Brazing of aluminium products such as aluminium heat exchangers are generally performed by means of continuous atmosphere furnaces which are advantageous technologically and economically.

By a mesh belt circulating through a continuous atmosphere furnace, aluminium products are conveyed into the furnace, in which they successively pass through a moisture drying furnace, front chamber, preheating furnace, heating furnace, cooling chamber, and air cooling chamber, whereby the brazing completes. In the heating furnace, a solder material and flux which have been fitted in advance onto parts of the aluminium products to be brazed, are melted in order of flux first and solder next for having them brazed.

In order to braze the products satisfactorily, it is important that the products which are conveyed into the heating furnace, shall be brought to a brazing temperature promptly and evenly all over the products. For this end, that is, in order to heat the products evenly all over the products in such manner, they must be kept under a certain degree of temperature for a considerable period of time. In pracice, the products are heated to a temperature around melting points of the flux and solder in the preheating furnace, in advance of brazing them in the heating furnace.

While it is improtant as mentioned above to shorten the period of time for heating the products in the heating furnace, it is economical too to shorten a period of time for preheating the products in the preheaing furnace beforehand.

However, it is not easy at all to preheat the easily oxidizable aluminium products rapidly without adversely affecting their qualities.

Those fluxes which are used for brazing aluminium products, are fluoric compounds or alkali metal chlorides containing fluorides, and have a melting point of about 550° C. to 500° C. Solders of Al—Si systme which are generally used for brazing of this kind, have a melting point of 500~630° C.

In other words, a heating range of a heating furnace of the continuous frunace for brazing aluminium products is 500~630° C., while a preheating range of a preheating furnace thereof is up to 500° C.

It is known that a heating method primarily made by means of convection heat is more effective than heating primarily by radiation, for heating at a comparatively low temperature of less than 500° C. Therefore, it seems reasonable to employ the heating method primarily made by convection, also in the preheating furnace of the aluminium brazing furnace, heating range of which is up to 500° C.

However, surprisingly, in the preheating furnaces for brazing aluminium products, the heating method primarily made by means of convection has not been employed. This is on account of reasons stated below.

On one hand, a neutral gas such as nitrogen and the like is continuously supplied into a preheating furnace as its furnace atmosphere, so that aluminium products themselves and solders and fluxes for brazing them shall not be oxidized in the preheating furnace, temperature of which has been elevated. On the other hand, oxygen is inevitably brought into the furnace, adhering to the products or adhering to a mesh belt which transports the products. When the preheating furnace is heated by the heating method made primarily by radiation, such oxygen is scarcely dispersed in a furnace atmosphere.

However, when the atmosphere in the preheating furnace is agitated and heated by convection currents produced by fans, the oxygen entered into the furnace as a distrabance thereof is also stirred up and circulated in the preheating furnace, resulting in polluting its atmosphere. Especially, fluxes themselves which are to work as reducing and fluidizing agents, are oxidized at considerably large parts thereof, in advance of working in the heating furnace. Such will largely interfere with a succeeding brazing operation, even though the products are heated rapidly in the preheating furnace.

In view of the above, the object of this invention is to provide a brazing method of aluminium products and a furnace therefor, which are characterized in that the aluminium products can be preheated by the heating method which is made primarily by convection currents, rapidly and without interfering with brazing of the aluminium products in the heating furnace.

In other words, the subject of this invention is to make a heating time shorten so that the brazing of aluminium products can be operated more effectively than before, when they are brazed by heating in a continuous furnace comprising preheating and heating furnaces.

DISCLOSURE OF INVENTION

In the brazing method of aluminium products and the furnace therefor which are covered by this invention, a neutral furnace atmosphere gas such as nitrogen and the like which is heated in a preheating furnace by heating means such as radiant tubes, agitated by a fan, and convectively moved in the furnace, is contacted with carbonaceous materials such as graphite which form inner furnace walls of the preheating furnace. Accordingly, even when oxygen is brought into the atmosphere gas, it makes a contact with said carbonaceous materials, being reacted into CO, whereby the furnace atmosphere gas is kept low at its oxygen concentration, and neutral. The method of this invention is further explained with reference to a continuous atmosphere furnace which is suitable for exercising it and which is illustrated in the accompanying drawing.

A plan view of the continuous atmosphere furnace for brazing aluminium products is illustrated as a whole and explanatorily in FIG. 1. By means of a driving apparatus 2 and a driven apparatus 3, a mesh belt 1 is circulated in the furnace in the direction of arrows. The aluminium products to be brazed pass successively through a moisture drying furnace 4, front chamber 5, preheating furnace 6, heating furnace 8, cooling chamber 9, and air cooling chamber 10, being conveyed by the mesh belt 1. The aluminium products (not shown) are preheated to about 500° C. in the preheating furnace 6, in advance of being brazed in the heating furnace 8. An explanatory section of this preheating furnace is shown by FIG. 2.

Furnace inner walls 11 of the preheating furnace 6 which are insulated from the outside with ceramic fibers and bricks, are rectangular at their cross sections, and made from graphite. Inside them, the mesh belt 1 runs. The mesh belt within the furnace inner walls 11 makes a going trip, while the belt underneath the preheating furnace makes a returning trip. There is provided a buffle 12 made from stainless steel, so that it overlies the going trip of mesh belt 1, and there is provided a nitrogen gas supplying pipe 13 which opens inside the buffle.

Inside the furnace inner walls 11, there are provided four radiant tubes respectively up and down and transversely to the mesh belt, and eight in total, among which only upper one and lower one of them are illustrated in FIG. 1. Blades 16 of fans 15 which are rotated by motors 7, are located above the buffle 12. The fans 15 (that is, the driving motors 7) are provided at two locations with a distance therebetween in the longitudinal direction of the furnace.

While thermocouples and sampling pipes are provided so as to protrude at their ends within the furnace inner walls 11, their illustration are omitted in FIG. 2.

BEST MODE FOR EXCERCISING THE INVENTION

EXAMPLE

Figure 1:
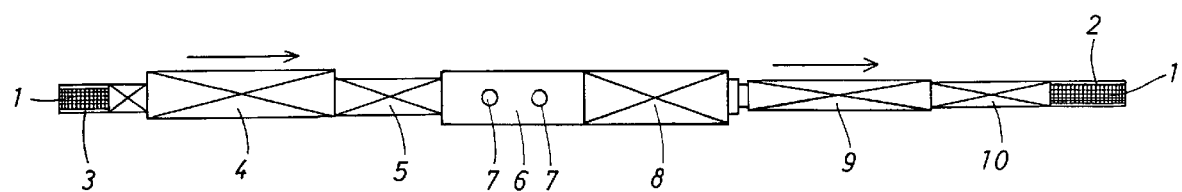
FIG. 1 is a plan view showing a preferable example of continuous atmosphere furnaces for performing this invention, generally by their constituent parts.
Figure 2:
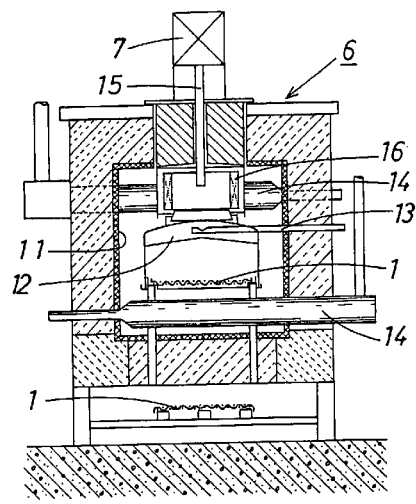
FIG. 2 is an explanatory sectional view of the preheating furnace in FIG. 1.

Heat exchangers made from aluminium and of 0.5 Kg each were fixed by jigs of 2 Kg, and three of these aluminium products were aligned in a line along a direction which is transverse to the driving direction of the mesh belt. Such lines were successively placed on the mesh belt 1, whereby they were sent into the aforementioned continuous atmosphere furnace. Those portions of the aluminium products which were to be brazed, had been applied by NOCOLOK flux (a trade name of Alcan Co.) made from fluoric compounds having a melting point of 540° C. and also by an Al—Si system solder having a melting point of 585° C.

A nitrogen gas which was introduced by the pipe 13 within the furnace inner walls 11 of the preheating furnace having a rectangular cross section, was heated by the radiant tubes 14 and agitated by the blades 16 of the fan 15, whereby it made convection currents within the furnace inner walls and heated the aluminium products which were sent into the preheating furnace 6. When a time of staying of the aluminium products within the preheating furnace 6 which was required to heat them up to 500° C., was measured, it was 8 minutes.

COMPARATIVE EXAMPLE

When the fans 15 were stopped to rotate, and the time of staying the aluminium products within the preheating furnace 6 for heating said aluminium products up to 500° C. was measured similarly to the above Example, it was 14 minutes.

When the oxygen concentration of nitrogen gas atmospheres respectively in the above Example and this Comparative Example was continuously measured, it was kept as low as 30~50 ppm in the both examples. In either case of the above Example and Comparative Example, there was not observed any trace of oxidation on the aluminium products per se and the flux and solder applied on them.

While in the above-mentioned mode of this invention, only the furnace inner walls 11 of the preheating furnace 6 were made carbonaceous, it is a matter of course that whole parts or a part of the fans 15 and/or buffles 12 might be made carbonaceous. These are other embodiments falling within the scope of this invention.

As apparent from what has been described above in detail, brazing operations of aluminium products become shorten in the time, when they are performed in accordance with this invenion method and by this invention continuous heating furnace, resulting in producing excellent effects that they can be made economically advantageously and certainly.

The invention claimed is:

1. A method for brazing aluminum products, comprising:
   a) providing a heating furnace including a preheating furnace having carbonaceous walls;
   b) providing the preheating furnace before the heating furnace;
   c) providing a fan configured for convectively fanning a gas in the preheating furnace;
   d) preliminarily heating up aluminum products which are to be conveyed into the heating furnace through its preheating furnace, the aluminum products being preliminarily heated up in the preheating furnace immediately before they are brazed in the heating furnace, and near to a brazing temperature of aluminum products of 500-630° C.; and
   e) introducing into the gas in the preheating furnace a neutral nitrogen gas which is heated and fanned convectively in the preheating furnace having the carbonaceous walls, whereby its oxygen partial pressure is kept sufficiently low so that there is substantially no observable oxidation on the resultant preheated aluminum products, preheated but before-melting fluxes, and preheated but before-melting solders each applied on the resultant preheated aluminum products.

2. A furnace as in claim 1, wherein:
   a) only the walls of the preheating furnace are carbonaceous.

* * * * *